Dec. 15, 1925.  E. W. TEMPLIN  1,565,527
TORQUE NEUTRALIZING MECHANISM FOR MOTOR VEHICLES
Filed Oct. 19, 1921  7 Sheets-Sheet 2

Inventor
Ellis W. Templin

Attorney

Dec. 15, 1925.  1,565,527
E. W. TEMPLIN
TORQUE NEUTRALIZING MECHANISM FOR MOTOR VEHICLES
Filed Oct. 19, 1921    7 Sheets-Sheet 4

Inventor
Ellis W. Templin
By
Attorney

Dec. 15, 1925.   1,565,527
E. W. TEMPLIN
TORQUE NEUTRALIZING MECHANISM FOR MOTOR VEHICLES
Filed Oct. 19, 1921   7 Sheets-Sheet 5

Inventor
Ellis W. Templin
Attorney

Dec. 15, 1925.
E. W. TEMPLIN
1,565,527
TORQUE NEUTRALIZING MECHANISM FOR MOTOR VEHICLES
Filed Oct. 19, 1921
7 Sheets-Sheet 7

Inventor
*Ellis W. Templin*

By
*R.D. Trogner*
Attorney

Patented Dec. 15, 1925.

1,565,527

UNITED STATES PATENT OFFICE.

ELLIS W. TEMPLIN, OF AKRON, OHIO, ASSIGNOR TO THE GOODYEAR TIRE & RUBBER COMPANY, OF AKRON, OHIO, A CORPORATION OF OHIO.

TORQUE-NEUTRALIZING MECHANISM FOR MOTOR VEHICLES.

Application filed October 19, 1921. Serial No. 508,844.

*To all whom it may concern:*

Be it known that I, ELLIS W. TEMPLIN, a citizen of the United States, residing at Akron, in the county of Summit and State of Ohio, have invented new and useful Improvements in Torque-Neutralizing Mechanism for Motor Vehicles, of which the following is a specification.

My invention relates, broadly, to running gear for power driven vehicles and more specifically to improvements in mechanism for neutralizing the torque effects in vehicles that embody, as a driving feature, a plurality of live axles.

In my co-pending applications, Serial No. 382,046, filed May 17, 1920, and Serial No. 481,519, filed June 30, 1921, I have disclosed types of running gear, of the character above designated, in which two spring-suspended live axles are connected for oscillating movement, as a unitary structure, about a common horizontal axis, by a type of torque neutralizing mechanism that is adapted to permit individual movement of the axles into various positions of relatively angular relation.

My present invention comprehends a torque neutralizing mechanism that is an improvement of the forms previously disclosed in my said co-pending applications, and is directed generally toward providing a more flexible structure in which the torque effects of one axle oppose similar effects of the other axle.

More particularly, my invention is designed with the important object in view of utilizing this principle previously set forth, in torque neutralizing mechanisms, which are adapted respectively for use with running gears that embody different combinations of driving elements as will hereinafter become apparent.

Other objects will appear when the following detailed description is read in conjunction with the accompanying drawings, which disclosure, it is believed, will suffice to impart a clear understanding of the invention as identified by the claims appended hereto.

Figure 1:
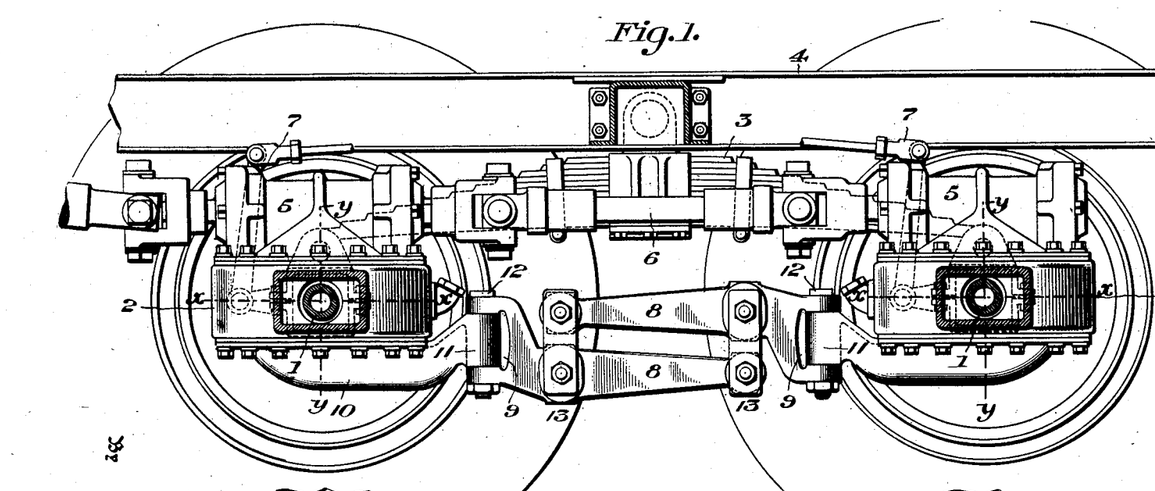
Fig. 1 is a longitudinal sectional view, with parts shown in elevation, of a portion of a vehicle chassis illustrating the application of my invention in conjunction with a preferred form of driving mechanism.
Figure 2:
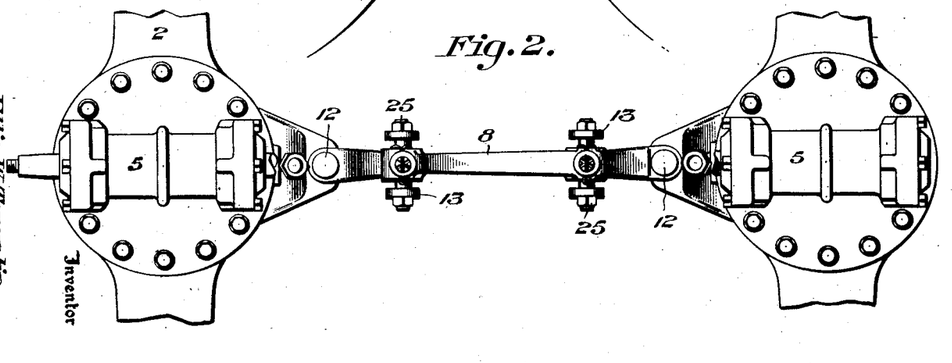
Fig. 2 is a top plan view of a portion of the mechanism illustrated in Fig. 1, parts being broken away for the sake of clearness.

In the practice of my invention, as will be seen by referring to Figs. 1 and 2, my preferred form of torque neutralizing mechanism is peculiarly adapted for use with that form of running bear that embodies, in duplicate, a worm driven type of wheel carrying axle. Running gears of this type are described in detail in my first mentioned co-pending application, and, inasmuch as the driving mechanism per se forms no part of the present invention, a detailed description thereof is deemed unnecessary in the present instance. It will be apparent, by reference to the drawings, that the axles 1, of which there are two, are each provided with a housing 2 that is freely mounted thereon, and that these housings are connected for relative movement toward or from each other by springs 3, which are, in turn, pivoted to the frame 4 in such manner that both the axles and the housings may oscillate as a unit about a common horizontal axis. Worm driving connections, not shown, for each axle, are enclosed by the casings 5, which may be bolted or otherwise suitably secured to the housings 2 and a universally connected telescopic shaft 6 serves to couple the driving connections of each axle for simultaneous operation. So much of a braking mechanism, as will be necessary to show that the major elements thereof are carried upon the axle housings in this form of running gear, has been illustrated at 7, and is fully described in either of my said copending applications.

From the foregoing it will be obvious that substantially all of the mechanism that is associated with each axle is supported by its axle housings for movement therewith in accordance with the direction of movement of the axle, and also in the direction in which the housing thereof is urged by the effects of the driving and the braking torque.

A running gear of the above described characteristics must obviously be equipped with means for preventing relative movement of each axle housing about its respective axle, through the torque effects from the latter, but, at the same time, such means in its ideal embodiment, should be adapted to permit relative movement of the housings in various other directions with a minimum resistance to such movement.

Figure 3:
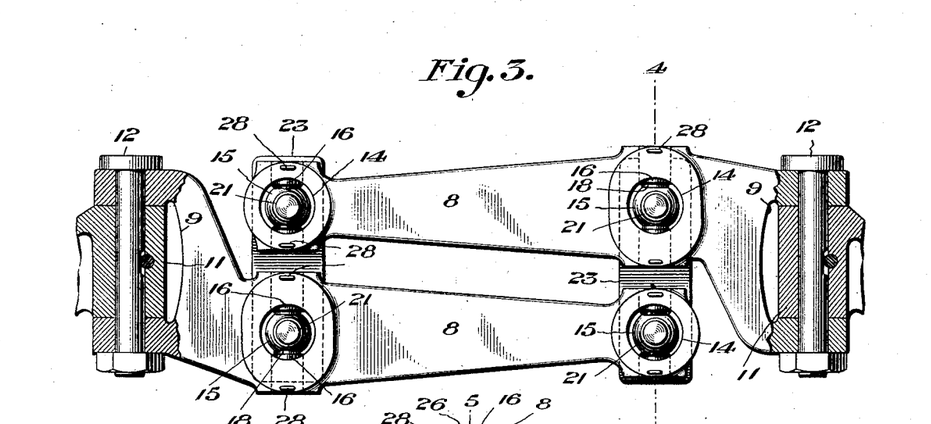
Fig. 3 is an enlarged detail view of the form of torque neutralizing mechanism illustrated in Fig. 1, parts being shown in side elevation and parts in section.
Figure 4:
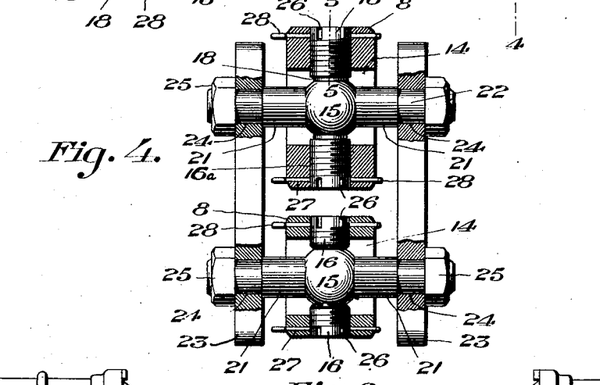
Fig. 4 is a vertical sectional view taken on the line 4—4 of Fig. 3, showing the construction on a further enlarged scale.
Figure 5:
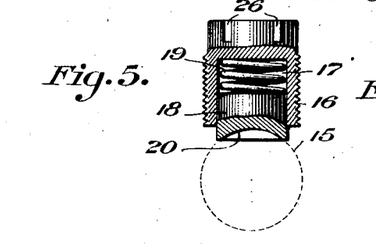
Fig. 5 is an enlarged detail sectional view taken on the line 5—5 of Fig. 4.

The mechanism which I prefer to utilize with this type of running gear, in accomplishing the results above set forth, comprises, generally speaking, torque bars 8 which are arranged in such relation that the torque effects from one axle are directed in opposition to the torque effects of the other axle. As shown in Fig. 1 of the drawings, these bars are disposed in superposed parallel relation, longitudinally of the running gear, and preferably in the median plane thereof. Each torque bar 8 is bifurcated, at one end thereof, as at 9, and is mounted in such relation to its associated housing that it is free for movement with respect thereto about a relatively vertical axis. Preferably the form of mounting illustrated in Fig. 1 is provided for accomplishing this purpose and comprises an arm 10 which may be bolted or otherwise secured to its adjacent housing 2, and a sleeve portion 11, to which the bifurcated end 9 of the arm may be pivotally connected as by a bolt 12. The torque arms 8 are connected together by means of shackles 13, one of which is shown in detail in Fig. 4. Two of these shackles are preferably employed and they, together with the arms 8, are so arranged as to connect the outer end portion of each arm to an intermediate portion of the other arm. By reference to Figs. 3 and 4, it will be seen that each arm 8 is provided with two openings 14 which are located, one at the outer end of the arm and the other at an intermediate point in the arm, preferably adjacent the axis of vertical movement thereof. It will be noted that, owing to the arrangement and construction of the arms, the opening 14 in the end of each arm is normally in vertical alignment with the opening 14 in the intermediate portion of the other arm. Each of these openings is designed to receive a ball member 15, which is seated therein, by means presently to be described, in such manner that it will act, together with its seat, in the capacity of a universal joint, whereby the arms 8 are adapted to move in various directions to compensate for relative movements of the housings 2. To provide a suitable seat for the ball, each arm is bored diametrically of its respective openings 14 to provide vertically aligned threaded openings 16ª which are designed to receive respectively a threaded plug 16. Certain plugs 16 of each arm 8, preferably those at the intermediate portion thereof, are respectively chambered at one end, as best shown at 17 in Fig. 5, to receive a ball seating member 18 that is adapted to reciprocate in its chamber 17 and to be normally pressed in an outward direction relative thereto by an expansible spring 19 or any other resilient medium. As best shown in Fig. 5, each of the spring pressed seating members 18 is provided with a concave end portion 20 whereby oppositely disposed members securely clamp their associated ball member 15 therebetween. The ball members 15, at the intermediate portion of each arm 8, are yieldably supported for floating movement in a vertical direction and this construction may be adopted at the end of each arm, if desired, although, as shown, I have elected to merely concave the end of the plugs 16 at these latter points and to seat the ball member at the end of the arms between such concave portions.

Each ball 15 is provided with diametrically opposite arms 21 that project in a lateral direction through the openings 14 beyond the sides of each bar 8 and are provided with reduced threaded end portions 22. The vertically aligned ball members 15 of each arm are connected by link elements 23, which are respectively apertured, as at 24, to receive the end portions 22 of the arms 21. Preferably, the links 23 are clamped on the arms 22 by means of nuts 25, although this may be a loose connection if desired. Each plug 16 is provided with diametrically disposed slots 26 at its outer end and the arms 8 are provided with transverse apertures 27 through each of which a cotter pin 28 may be inserted, when one of the slots 26 is in alignment therewith, to keep the plugs from turning and thereby allowing the ball to become unseated. In this connection, it will be noted that the plugs 16 are adjustable and may be retained in any desired position. This feature provides for taking up wear of the ball seats 20, and for regulating the tension of the springs 17 in those plugs that embody the resilient seating feature.

The foregoing construction provides for what may be termed universal relative movement of the torque arms with a minimum degree of resistance against such movement in all directions except one, i. e., vertically with respect to each other or, in other words, in the direction in which they are normally urged by the torque effects of the axle housing. For instance, they may turn individually about their respective longitudinal axes as the axles and housings oscillate in a vertical plane about their transverse horizontal axes $x$—$x$, and they may cross each other when said axles and housings move individually about their respective vertical minor axes $y$—$y$, or in the latter event, by virtue of the bolts 12, they may move as a unit from side to side and longitudinally of each other. Again, they may move longitudinally of each other, as when the axles separate or approach each other. Although a very slight degree of movement in this latter direction occurs in a running gear of this type, inasmuch as the springs 3 are substantially horizontal under load and the range of movement of their ends in a full sized truck is usually not more than one inch, the maximum degree of relative movement of the bars 8 in a longitudinal direction has been assured, as will presently be apparent.

As the load on the truck is increased, the deflection of the springs 3 forces the two housings 2, and their associated axles apart. As the two housings move apart, the wheels mounted on the axles 1 serve to limit the movement of the axles 1 to a single horizontal plane parallel to that surface on which the wheels rest. The ends of the arms 8 move in short arcs about the pins 21 as axes, the links 23 serving to keep the arms 8 always in parallel relationship, but permitting relative longitudinal movement thereof, and that consequent relative movement toward and away from each other caused by the arcuate movement about the pins 21. The relative movement toward and away from each other of the arms 8 causes a slight relative movement of the axles 1 and the associated spring connection, but this movement in no manner interferes with the proper operation of the springs.

By virtue of the construction of the ball and socket joint, previously described, the pivotal connection of the shackle intermediate each arm is free for play, against a yielding resistance, in a vertical direction relative to the opposite arm 8. The tendency of the housings to turn about their axes from the driving and the braking torque effects is, however, obviated by the opposed relation of the arms 8 and the springs 17, it being understood that the springs 17 are of sufficient strength to overcome the normal driving and braking torque effects from each axle.

As before stated, the arms 8 may cross each other in certain positions of the axle housings. This action may occur when the housings move toward or from each other by virtue of the shackle and ball and thereby sufficiently compensate, in certain instances, for the operation of the spring 19. Therefore, I may omit the springs 19 and employ merely the type of ball and seat devices illustrated at the end of each arm.

Figure 6:
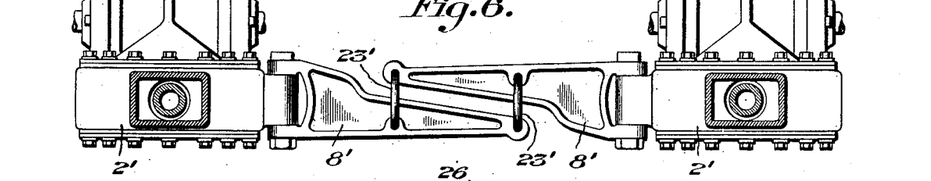
Fig. 6 is a view of a modified form of the torque neutralizing mechanism.

In Fig. 6 I have disclosed a modified form of this shackle connection in which the resilient ball joint is omitted. The relative arrangement of the torque arms 8' and their disposition with regard to their respective axle housings 2' is similar to that previously described. The connections between the torque arms 8', however, have been indicated as comprising links 23' which pivot the arms together for relatively swinging movement, as will be clearly seen from the illustration thereof.

Figure 7:
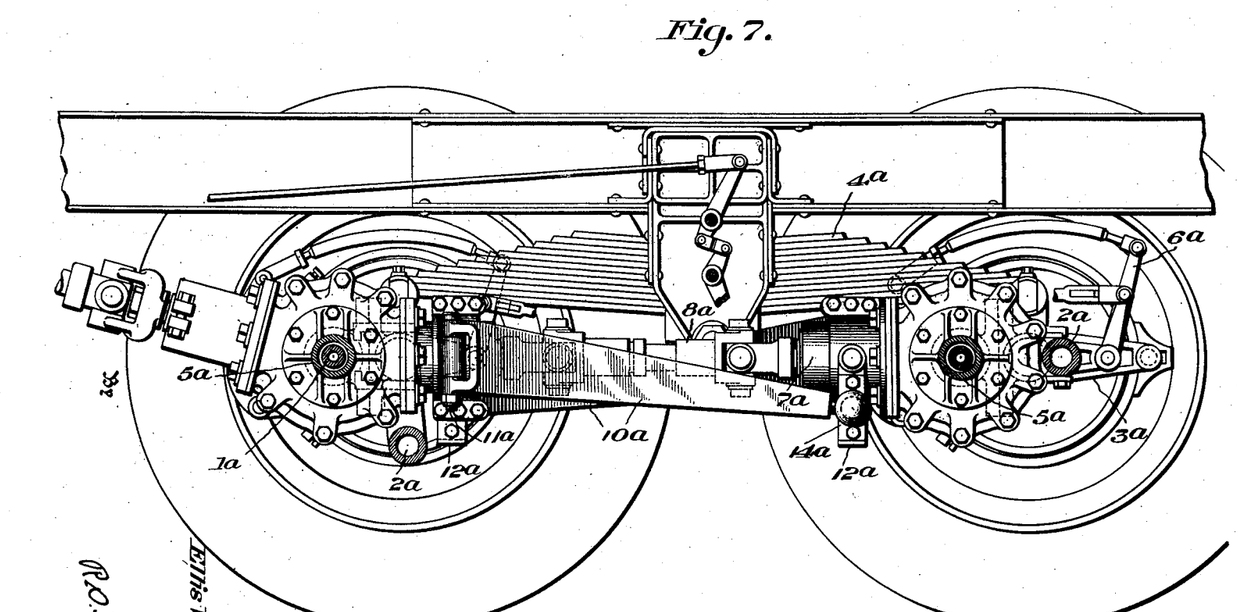
Fig. 7 is a view similar to Fig. 1 illustrating another modified form of torque neutralizing mechanism adapted for utilization with a running gear that embodies a different organization of driving elements.
Figure 8:
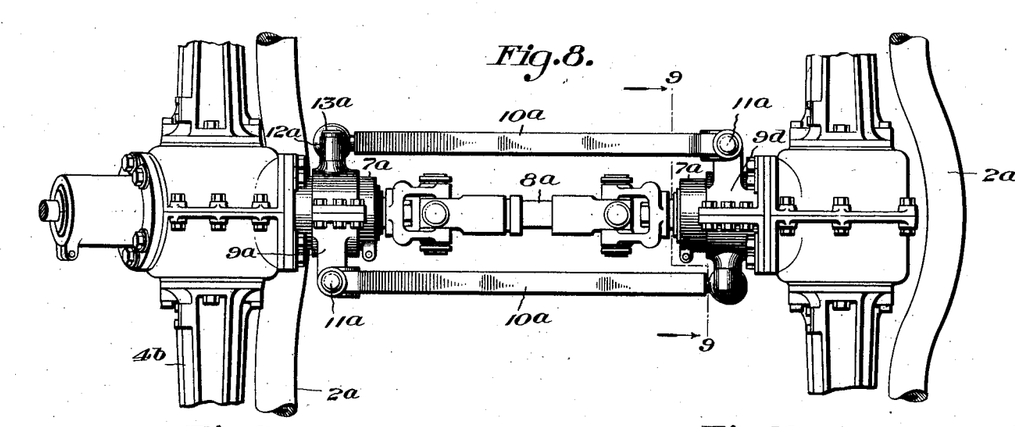
Fig. 8 is a top plan view of a portion of the mechanism shown in Fig. 7.
Figure 9:
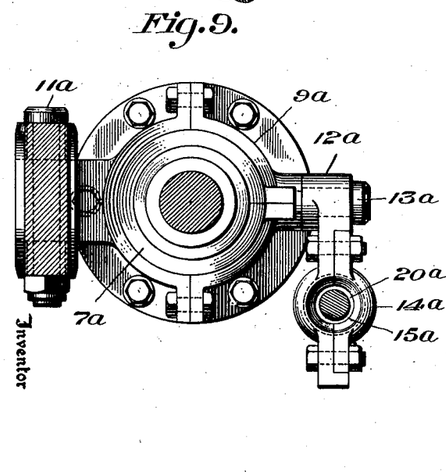
Fig. 9 is an enlarged transverse sectional view taken on the line 9—9 of Fig. 8.

In Fig. 7 another adaptation of the principle of my invention has been disclosed. In this form the torque neutralizing mechanism has been modified for application to a type of driving mechanism generally known as an "internal gear drive" and is described in detail in my second aforesaid co-pending application.

It is sufficient to say in this instance that in this form of running gear an individual driving unit for each pair of wheels is utilized comprising, respectively, a live axle 1$^a$ and a dead wheel carrying axle 2$^a$ and that the former axles are mounted upon the latter by means of swingable brackets, one of which is shown at 3$^a$. The live axles are geared to their respective wheels in any suitable manner, not shown. The springs, one of which is shown at 4$^a$, also in this instance connect each driving unit to the frame for oscillating movement about an horizontal axis, as in the running gear previously described and as shown in Fig. 7 of the drawings. It will be noted that the live axles each embody a housing 5$^a$ that is mounted by means of the aforesaid bracket 3$^a$ upon the dead axle 2$^a$ and that the braking mechanisms, designated generally 6$^a$, are also mounted upon these brackets for oscillating movement about the dead axle, together with the housings $5^a$ and the axles $1^a$. Each of the housings $5^a$ is provided with a projecting sleeve portion $7^a$ in which the telescopic shaft $8^a$, that couples the live axles together, is journalled.

Figures 10, 11:
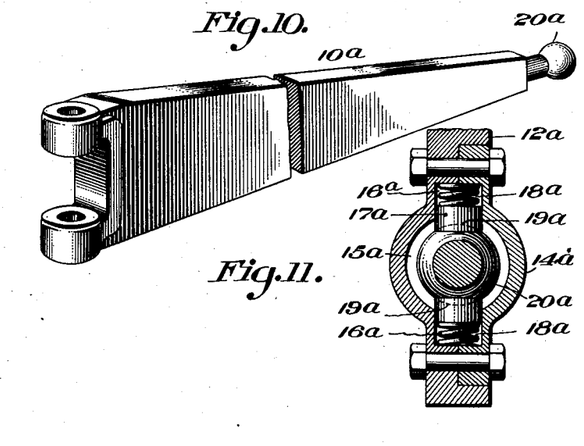
Fig. 10 is an enlarged perspective view of one of the members of the mechanism illustrated in Figs. 7 and 8.
Fig. 11 is a sectional view, on a further enlarged scale, of certain details of the mechanism shown in Figs. 7, 8 and 9.

My modified form of torque mechanism is specifically designed to connect the housings together by means of these sleeves $7^a$. To this end each sleeve is provided with a collar $9^a$, one of which, preferably the collar associated with the rear live axle, is fixed relative thereto. The oppositely disposed collar is preferably mounted for rotative action upon its associated sleeve but is restrained against longitudinal action with respect thereto. Torque bars $10^a$ are also employed in this modified form, but are spaced laterally from each other in order that one of each may be disposed upon either side of the telescopic shaft $8^a$. The torque bars $10^a$ are designed to connect the collars $9^a$ in such manner that the same effects are accomplished as previously described relative to the preferred form of my invention. One end of each bar is therefore pivotally connected as at $11^a$ to one of the collars $9^a$ for movement about a vertical axis with respect thereto and the opposite end of each bar and its associated collar are provided with a modified form of shackle connection therebetween. This form of shackle comprises a depending link $12^a$ that is pivoted at its upper end as at $13^a$ for movement about a horizontal axis that coincides with the horizontal diameter of its associated collar $9^a$. At its lower end the link $12^a$ is provided with a cap plate $14^a$ that, together with its associated portion of the link, is constructed to provide a spherical socket $15^a$. The interior portion of this socket is constructed to provide vertically aligned seats $16^a$ which receive, respectively, resilient seating elements of the character previously described. That is to say, each seating element comprises a cylindrical plug $17^a$ that is normally forced in the direction of the center of the socket by means of a coil spring $18^a$ and is provided with a concave end portion $19^a$. Returning to the torque arms $10^a$ and as shown in Fig. 10, the opposite end of each arm, to that mounted for movement about a vertical axis, is provided with a ball member $20^a$ which is designed to be received in the socket $15^a$ between the concave faces of the plugs $17^a$.

It will now be apparent that by means of this construction, the axle housings $5^a$ and their associated axles are free to move with the axles about an axis extending longitudinally of the vehicle through collar $9^a$ by virtue of the rotative action of the collar $9^a$ about its sleeve $7^a$. Furthermore, the axle housings and their associate parts are free for individual movement about their vertical minor axis, such movement being compensated for by the pivotal connection $11^a$ and the resiliently seated ball element $20^a$ at the end of each arm. The action of this torque mechanism in neutralizing the torque effects, is similar to that previously described. That is to say, the ball and socket connections $20^a$ and $15^a$ provide for the yielding resistance against turning movement of either live axle and its housing about its associated dead axle and it is to be understood that, as in the former mechanism, the springs $18^a$ are of sufficient strength to counteract any normal torque effects on the housings $5^a$ that may arise through the action of the drive or braking mechanism.

As in my former type of mechanism, each axle unit is free to move toward or from the other by means of the pivotal connection of the links $12^a$. Movement of the torque arm $10^a$ during this latter action being in an arcuate path, it would appear that the tendency would be to slightly rotate the housing $5^a$ and its live axle about its associated dead axle. This tendency, however, is offset by the springs $18^a$ which yieldingly resist movement of one end of the bars in that direction and normally maintain the axle housings substantially in a relatively horizontal plane.

Figure 12:
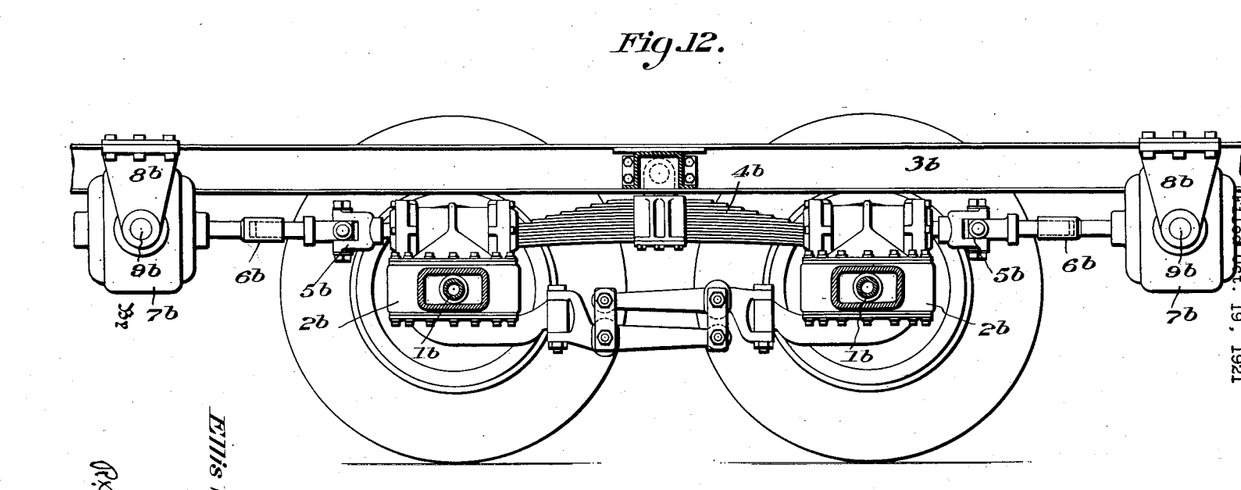
Fig. 12 is a view similar to Figs. 1 and 7 illustrating the application of my preferred form of torque neutralizing mechanism to a type of running gear that embodies another different organization of driving elements.

In Fig. 12 I have illustrated the application of my preferred type of torque neutralizing mechanism, previously described, in its application to a running gear that embodies a further modified type of driving mechanism.

In this latter form, the individual axles $1^b$ are each enclosed by a housing $2^b$ that is freely mounted thereon and is designed to enclose a worm drive of any desire type. The housings $2^b$ are also, in this form of the invention, coupled together for oscillating movement about an horizontal axis relative to the frame $3^b$ by means of springs, one of which is shown at $4^b$. The torque neutralizing mechanism per se is substantially identical, as above set forth, with reference to my preferred type previously described, but I have elected to utilize it in conjuction with an individual drive for each axle. That is to say, the worm drives for each axle $2^b$ are not coupled together but are each universally connected as at $5^b$ with a telescopic shaft $6^b$ which may be driven in any suitable manner as desired. I prefer, however, to employ the driving medium illustrated comprising an electric motor $7^b$ for each shaft $6^b$ and to mount these motors respectively for movement about an horizontal axis upon the frame $3^b$ of the chassis. This may be accomplished in any desired way, such as by means of brackets $8^b$ suitably secured to the frame $3^b$ between which the motor $7^b$ may be mounted by trunnions $9^b$ as illustrated.

In this type of individual drive for each live axle, the torque effects are substantially identical with those previously described and it is believed that the operation and result will be fully understood without further description.

Figure 13:
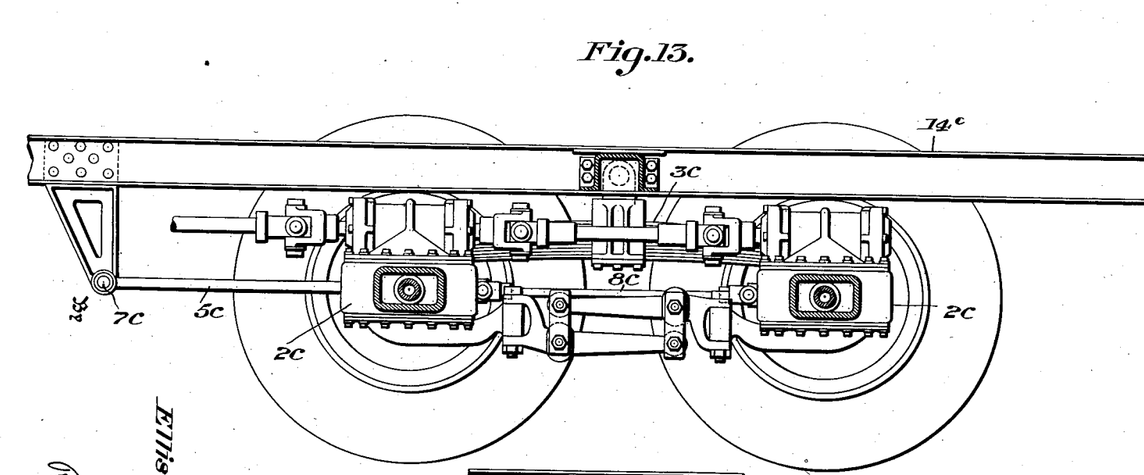
Fig. 13 is a similar view illustrating a modified form of running gear equipped with the torque neutralizing mechanism of this invention.
Figure 14:
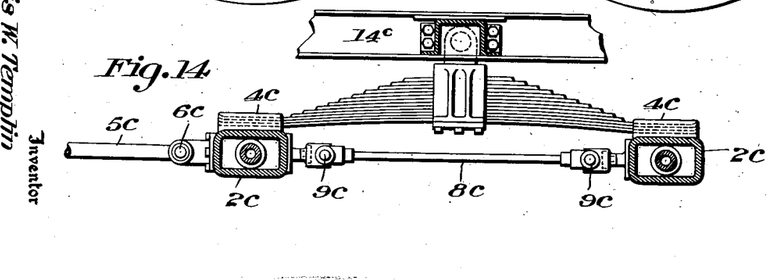
Fig. 14 is an enlarged detail view of a portion of the mechanism disclosed in Fig. 13.

In Figs. 13 and 14, I have illustrated my preferred form of torque neutralizing mechanism in its application to a running gear of still another modified form. In so far as this form of the invention is concerned, the foregoing descriptions, relative to the preferred form and that form of the invention shown in Fig. 12, apply in this instance both in regard to the torque neutralizing mechanism, the axle housings and the drive for each axle. The following additions to the structure of the running gear are, however, to be noted.

The springs, one of which is shown at 3°, although they are pivoted to the frame 14° for movement about an horizontal axis thereon, are slidably mounted at each end upon one of the axle housing 2°. If desired, guide members 4° may be employed in connection with each axle housing to prevent relative movement of the axles and the housings laterally of the springs. In this form of running gear, the driving thrust is taken up, not by the springs as in the former types of running gear, but by radius rods, one of which is shown at 5°. These rods may be arranged as desired and may connect both axle housings directly to the frame 14° but I prefer to utilize them in the manner shown in the drawings wherein each rod is pivotally connected to the forward axle housing at 6° and to the frame 14° at 7°. Obviously, the axle housings 2° in this form of the invention must be coupled together by means that will act in the capacity of the pivotal connections of the springs to their respective axles, as shown in the previously described forms of running gear. Any suitable means may be utilized, preferably that shown as comprising a reach bar 8° connected by universal joints 9° to each housing 2°. A running gear of this character is extremely flexible and constitutes an ideal construction when the torque neutralizing mechanism of this invention is utilized therewith and is, together with my previously described modified forms, illustrative of the wide scope of application of the principle of my torque neutralizing mechanisms.

Figure 15:
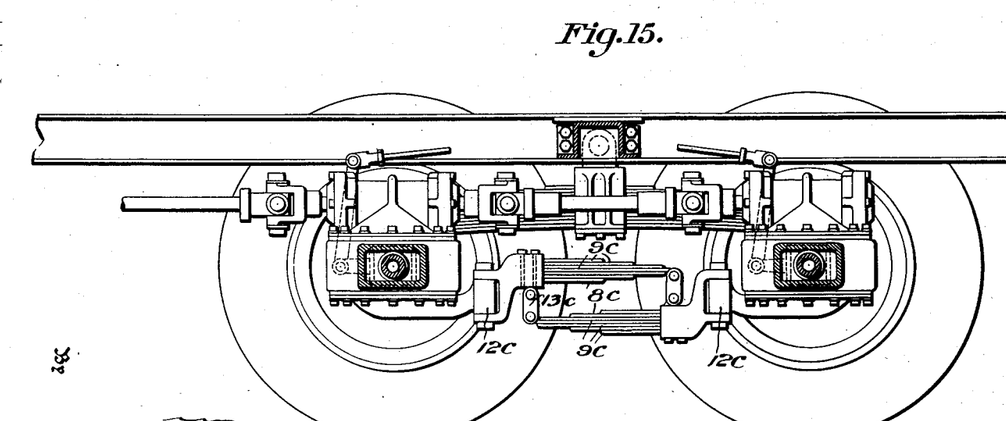
Fig. 15 is a sectional side elevational view illustrating another modified form of torque neutralizing mechanism.
Figure 16:
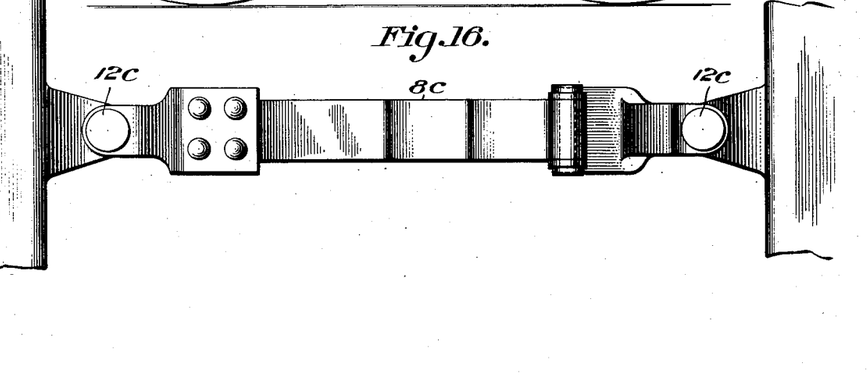
Fig. 16 is an enlarged fragmentary top plan view of the torque neutralizing mechanism shown in Fig. 15.

In Figs. 15 and 16 I have illustrated another modified construction and arrangement of torque rods comprehended by my invention. This form of torque rod is particularly adapted for use in conjunction with a running gear embodying, in general, the construction and assembly of elements previously described with reference to the preferred form of the invention. The torque bars 8° are, however, of resilient character and are built up of laminated spring members 9° which are constructed and arranged to provide a torque arm that is reduced in thickness at one end thereof. These arms are also disposed in superposed parallel relation to yieldingly oppose the torque effects from one of the axles 1° against similar effects from the other axle, as in the preferred form of my invention, and their general arrangement relative to the axles 1° is also quite similar to that of my preferred form. That is to say, each arm is pivotally connected at its thicker end to its associated axle for movement about a vertical axis as shown at 12°, and the arms are coupled together by a plurality of shackles 13° which are so disposed as to connect the thinner portion of each arm to the intermediate portion of the other arm. The ball and socket connection previously described is, however, omitted in this form and the yielding resistance feature is supplied by the construction of each arm as, it is believed, will be apparent without further explanation.

Although my invention has been described in detail and certain specific language has been employed in pointing out the merits thereof, it is to be understood that this disclosure, as before intimated, is merely illustrative and should not be interpreted to limit the invention either in scope or spirit unless such limitations are indicated in the claims appended hereto.

What I claim is:

1. In a vehicle chassis, the combination with a plurality of relatively movable live axles and individual housings mounted freely thereon, of torque neutralizing mechanism comprising superposed laterally spaced bars pivotally connected respectively to opposite housings, and means connecting the bars for relative adjustment in a vertical plane to oppose the torque effects of one axle against the torque effects of the adjacent axle.

2. A motor vehicle chassis comprising a frame, two pairs of rearwardly located load supporting wheels, axles for said wheels, housings for the axles, supporting springs connecting the housings with the frame, and a torque connection extending between the housings comprising an arm swingably mounted on each housing to move about a vertical pivot relative thereto, said arms being extended to superposed overlapping relation, a pair of shackle members each one of which is connected at one end to the end of one arm and at the other end to an intermediate portion of the other arm, said connections of the shackle members to the arms permitting universal movement at each point of connection.

3. In a vehicle chassis the combination with a plurality of relatively movable live axles and individual housings mounted freely thereon, of torque neutralizing mechanism adapted to yieldingly oppose the torque effects of one axle against such effects of the adjacent axle, said mechanism comprising spaced parallel bars pivotally connected respectively to opposite housings, and means interconnecting the bars for relative swinging adjustment upon movement of the axles toward or from each other.

4. In a vehicl chassis the combination with a plurality of relatively movable live axles and individual housings mounted freely thereon, of torque neutralizing mechanism adapted to oppose the torque effects of one axle against such effects of the adjacent axle, said mechanism comprising spaced parallel bars pivotally connected respectively to opposite housings, and pivoted link connections between the bars adapted to permit relative adjustment thereof in the direction of their length upon movement of the axles toward or from each other.

5. In a vehicle chassis the combination with a plurality of relatively movable live axles and individual housings mounted freely thereon, of torque neutralizing mechanism comprising spaced superposed bars connected respectively to opposite housings and means connecting the bars for relative universal movement, said means being adapted to yieldingly resist individual movement of the bars in each vertical direction.

6. In a vehicle chassis the combination with a plurality of relatively movable live axles and individual housings mounted freely thereon, of torque neutralizing mechanism comprising spaced normally parallel bars pivotally connected respectively to opposite housings for individual movement about a vertical axis and means interconnecting the bars for relative universal movement, said means being adapted to yieldingly resist individual movement of the bars in a vertical direction.

7. In a vehicle chassis the combination with a plurality of relatively movable live axles and individual housings mounted freely thereon, of torque neutralizing mechanism comprising superposed normally parallel bars connected respectively to opposite housings for individual movement about a vertical axis, and means connecting the bars for relative universal movement, said means being adapted to yieldingly resist individual movement of the bars in a vertical direction.

8. In a vehicle chassis the combination with a plurality of relatively movable live axles and individual housings mounted freely thereon, of torque neutralizing mechanism comprising superposed normally parallel bars connected respectively to opposite housings for individual movement about vertical axes, and means connecting the bars intermediate the housings for relative universal movement including a shackle and a resiliently seated ball joint adapted to yieldingly resist individual movement of the bars in a vertical plane.

9. In a vehicle chassis the combination with a plurality of relatively movable live axles and individual housings mounted freely thereon, of torque neutralizing mechanism comprising superposed normally parallel bars connected respectively to opposite housings for individual movement about vertical axes and means connecting the bars for relative universal movement, said means including a pair of shackles including ball joints respectively provided with adjustable resilient seats.

10. In a vehicle chassis, the combination with a pair of live axles and an axle housing associated with each of said axles, of a torque-neutralizing mechanism comprising a plurality of spaced parallel arms each pivotally connected to one of said housings to swing about a vertical axis, said mechanism embodying means adapted to permit rotative movement of said arms about their own longitudinal axis, and means adapted to permit limited elongation of said mechanism.

11. In a vehicle chassis, the combination with a pair of live axles and an axle housing associated with each of said axles, of a torque-neutralizing mechanism pivotally connected to each housing to swing about a vertical axis, said mechanism embodying means adapted to permit limited and prevent excessive elongation of said neutralizing mechanism.

12. In a motor vehicle, a pair or spaced substantially parallel driving axles, a housing rotatively mounted on each of said axles, and a torque neutralizing mechanism connecting said axles comprising four link members pivotally connected together to form a parallelogram.

13. In a motor vehicle, a pair of spaced substantially parallel driving axles, a housing rotatively mounted on each of said axles, and a torque neutralizing mechanism connecting said axles comprising an arm mounted on each of said housings and disposed in the same vertical plane, and two spaced link members each pivotally connected to both of said arms to form a parallelogram.

14. In a motor vehicle, a pair of spaced substantially parallel driving axles, a housing rotatively mounted on each of said axles, and a torque neutralizing mechanism connecting said axles comprising an arm pivotally mounted on each of said housings to swing about a vertical axis, said arms being disposed in the same vertical plane, and two spaced link members each pivotally connected to both of said arms to form a parallelogram.

15. In a motor vehicle, a pair of spaced substantially parallel driving axles, a housing rotatively mounted on each of said axles, and a torque neutralizing mechanism connecting said axles comprising an arm pivotally mounted on each of said housings to swing about a vertical axis, said arms being disposed in the same vertical plane, and two spaced link members each connected by means of a universal joint to both of said arms to form a parallelogram.

16. In a motor vehicle, a pair of spaced substantially parallel driving axles, a housing rotatively mounted on each of said axles, and a torque neutralizing mechanism connecting said axles comprising an arm mounted on each of said housings and disposed in overlapping relationship, and means for permitting relative longitudinal and lateral movements of said arms while maintaining them in parallel relationship.

17. In a motor vehicle, a pair of spaced substantially parallel driving axles, a housing rotatably mounted on each of said axles, and a torque neutralizing mechanism connecting said axles comprising four link members arranged to form a parallelogram, the link members being connected to each other at their points of interconnection by means of universal joints.

In witness whereof I have hereunto signed my name.

ELLIS W. TEMPLIN.